US007246290B1

(12) United States Patent
Green et al.

(10) Patent No.: US 7,246,290 B1
(45) Date of Patent: Jul. 17, 2007

(54) DETERMINING THE HEALTH OF A DESIRED NODE IN A MULTI-LEVEL SYSTEM

(75) Inventors: Eric O. Green, Austin, TX (US); Brian K. Cusson, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 843 days.

(21) Appl. No.: 10/284,640

(22) Filed: Oct. 31, 2002

(51) Int. Cl.
*G01R 31/28* (2006.01)

(52) U.S. Cl. ............................ 714/737; 324/765

(58) Field of Classification Search ............ 714/737, 714/738, 48, 2, 33, 726, 42, 25; 716/4; 324/765
See application file for complete search history.

(56) References Cited

U.S. PATENT DOCUMENTS

| | | | | |
|---|---|---|---|---|
| 5,546,408 A | * | 8/1996 | Keller | 714/741 |
| 5,796,990 A | * | 8/1998 | Erle et al. | 716/4 |
| 5,859,964 A | * | 1/1999 | Wang et al. | 714/48 |
| 6,461,882 B2 | * | 10/2002 | Ishida et al. | 438/17 |
| 6,622,264 B1 | * | 9/2003 | Bliley et al. | 714/26 |
| 6,651,204 B1 | * | 11/2003 | Rajsuman et al. | 714/738 |
| 6,745,358 B1 | * | 6/2004 | Watkins | 714/726 |
| 6,799,292 B2 | * | 9/2004 | Takeoka et al. | 714/726 |

* cited by examiner

*Primary Examiner*—Guy Lamarre
*Assistant Examiner*—Fritz Alphonse
(74) *Attorney, Agent, or Firm*—Williams, Morgan & Amerson, P.C.

(57) ABSTRACT

A method and apparatus are provided for determining the health of a desired node in a multi-level system. The method includes defining a first fault model associated with a first node of a first level of the system, defining a second fault model associated with a second node of a second level of the system, and defining a third fault model associated with a third node associated with a third level of the system. The method further includes determining a health value associated with at least one of the first node, the second node, and the third node of the system based on at least one of the first fault model, second fault model, and the third fault model.

27 Claims, 4 Drawing Sheets

DETERMINING THE HEALTH OF A DESIRED NODE IN A MULTI-LEVEL SYSTEM

BACKGROUND OF THE INVENTION

1. Field of the Invention

This invention relates generally to an industrial processing system, and, more particularly, to determining the health of a desired node in a multi-level semiconductor fabrication processing system.

2. Description of the Related Art

There is a constant drive within the semiconductor industry to increase the quality, reliability, and throughput of integrated circuit devices, e.g., microprocessors, memory devices, and the like. This drive is fueled by consumer demands for higher quality computers and electronic devices that operate more reliably. These demands have resulted in continual improvements in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

During the fabrication process, various events may take place that affect the performance of the devices being fabricated. That is, variations in the fabrication process steps may result in device performance variations. Factors, such as feature critical dimensions, doping levels, contact resistance, particle contamination, etc., all may potentially affect the end performance of the device. Various tools in the processing line are controlled, in accordance with performance models, to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability.

Semiconductor manufacturing processes, which have become more reliable and robust over the past few years, may include a plurality of processing tools that cooperate with each other to process semiconductor devices, such as microprocessors, memory devices, ASICs, etc. To verify that the processing tools are operating within acceptable parameters, it has become increasingly desirable to monitor the operating conditions of such processing tools.

Today's semiconductor manufacturing processes may include an intricate network of multiple processing tools for manufacturing semiconductor devices. In such an arrangement, while the processing tools may cooperatively work to process wafers, the fault detection analysis is typically performed on a tool-by-tool basis. That is, each processing tool generally has its own associated fault detection system for identifying faults with that particular processing tool 30. While discrete, independent fault detection systems are useful in evaluating the performance of individual processing tools, such fault detection systems provide a rather limited perspective on the overall performance of the manufacturing system. Further, the discrete, independent fault detection systems can be inflexible from the standpoint of providing varying perspectives of the performance of selected groups of processing tools, other equipment, or processes in the manufacturing system.

The present invention is directed to overcoming, or at least reducing the effects of, one or more of the problems set forth above.

SUMMARY OF THE INVENTION

In one embodiment of the present invention, a method is provided for determining the health of a desired node in a multi-level system. The method includes defining a first fault model associated with a first node of a first level of the system, defining a second fault model associated with a second node of a second level of the system, and defining a third fault model associated with a third node associated with a third level of the system. The method further includes determining a health value associated with at least one of the first node, the second node, and the third node of the system based on at least one of the first fault model, second fault model, and the third fault model.

In another embodiment of the present invention, an apparatus is provided for determining the health of a desired node in a multi-level system. The apparatus includes a storage unit and a control unit. The storage unit is adapted to store a first fault model associated with a first node of a first level of the system, a second fault model associated with a second node of a second level of the system, and a third fault model associated with a third node associated with a third level of the system. The controller is adapted to determine a health value associated with at least one of the first node, the second node, and the third node of the system based on at least one of the first fault model, second fault model, and the third fault model.

In a further embodiment of the present invention, an article comprising one or more machine-readable storage media containing instructions is provided for determining the health of a desired node in a multi-level system. The one or more instructions, when executed, enable the processor to define a first fault model associated with a first node of a first level of the system, define a second fault model associated with a second node of a second level of the system, define a third fault model associated with a third node associated with a third level of the system, and determine a health value associated with at least one of the first node, the second node, and the third node of the system based on at least one of the first fault model, second fault model, and the third fault model.

In a further embodiment of the present invention, a system is provided for determining the health of a desired node in a multi-level system. The system includes a module and a fault detection system, the module having at least two processing tools adapted to provide operational data associated with processing of workpieces. The fault detection system is adapted to define a first fault model associated with at least one of the two processing tools, define a second fault model associated with the module, define a third fault model associated with the system, and determine a health value based on operational data and the at least one of the first fault model, second fault model, and third fault model.

BRIEF DESCRIPTION OF THE DRAWINGS

The invention may be understood by reference to the following description taken in conjunction with the accompanying drawings, in which like reference numerals identify like elements, and in which.

Figure 1:
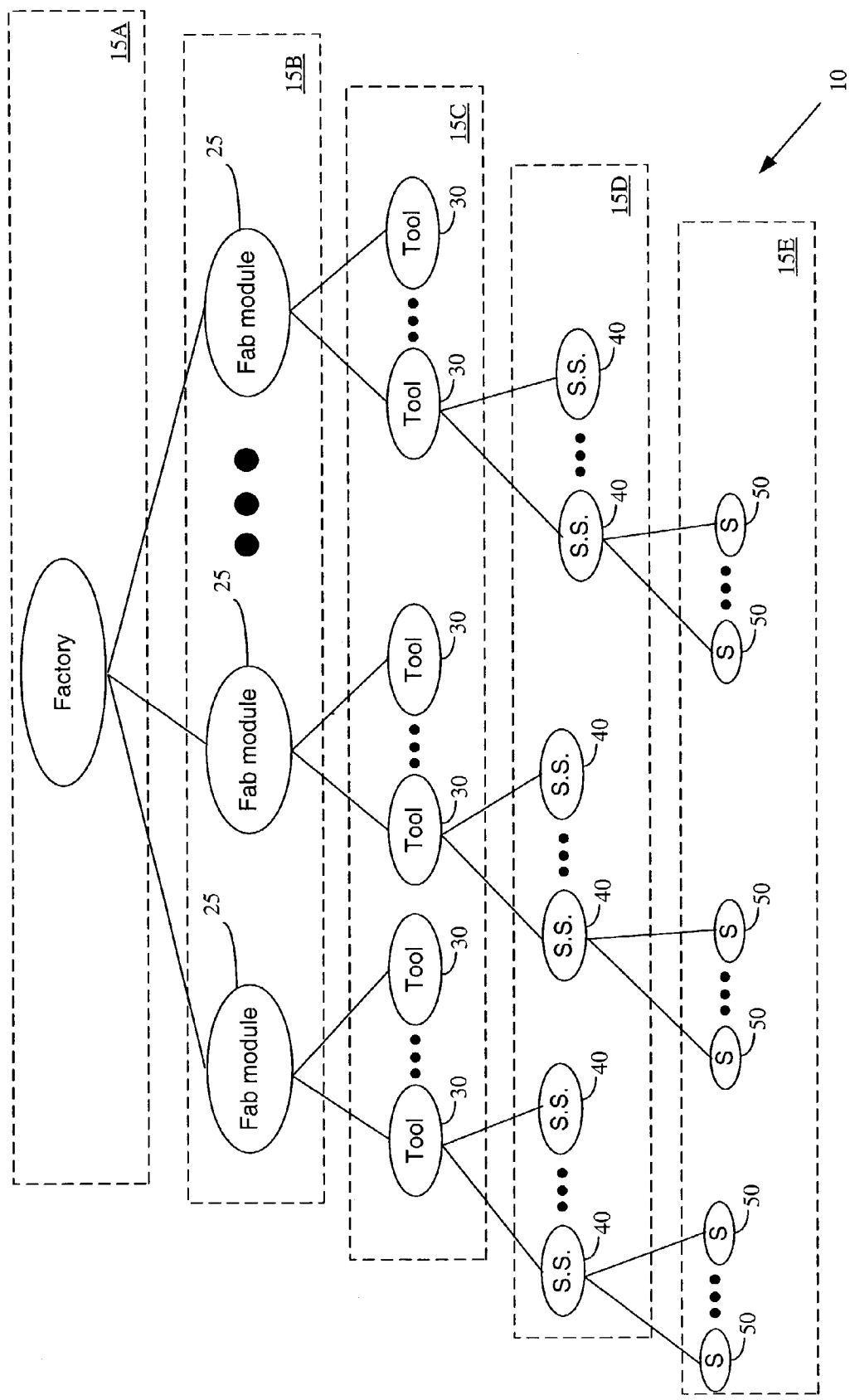
FIG. 1 illustrates an exemplary hierarchical view of a system, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As described in greater detail below, one or more embodiments of the present invention enable a user to assess the health (or performance) of various components at various levels in a manufacturing system. For example, at one end of the spectrum, the user may be able to gauge the performance of the manufacturing system as a whole. At the other end, the user may assess the performance of a particular sub-system or sensor within a processing tool of the manufacturing system.

Referring now to FIG. 1, a hierarchical view of an industrial system (or factory) 10 is illustrated, in accordance with one embodiment of the present invention. The industrial system 10 may implement any one of a variety of industrial processes, such as a semiconductor fabrication process, a photographic process, a chemical process, and the like. For ease of illustration, the industrial system 10 depicted in FIG. 1 is a semiconductor manufacturing system.

The semiconductor fabrication system 10 of FIG. 1 includes a plurality of levels 15A-E. The first level 15A, shown as the highest level in the illustrated embodiment, represents an entire factory (or the manufacturing system) 10. Below the first level 15A is the fabrication module level 15B, which may include a plurality of "fab" modules 25. Each "fab" module 25 is typically directed to accomplishing a particular project objective. Examples of a "fab" module 25 in the context of a semiconductor fabrication process include diffusion, etch, lithography, thin films, and chemical mechanical planarization (CMP).

Each "fab" module 25 may have one or more processing tools 30 associated therewith. The processing tools 30 belong to the tool level 15C, which, in the illustrated embodiment, is below the fabrication module level 15B. In one embodiment, an intermediate "tool-set" level (not shown) may lie between the fabrication module level 15B and tool level 15C, where the "tool-set" level may include tools that are manufactured, for example, by the same vendor to accomplish a common process such as thermal oxidation, deposition, and the like.

The tool level 15C, depending on the associated "fab" module 25, may include exemplary processing tools 30 such as exposure tools, etch tools, deposition tools, polishing tools, rapid thermal anneal processing tools, test-equipment tools, ion implant tools, packaging tools, and the like.

Each processing tool 30 may include one or more subsystems 40, which, in the illustrated embodiment, collectively belong to the sub-system level 15D. A "sub-system" may be defined, for example, according to the type of function performed (e.g., transporting wafers, heating zones, pressure regulating zones, and the like) by that "sub-system."

Each sub-system 40 may have one or more sensors 50 associated therewith for monitoring variables in the sub-system 40. In the illustrated embodiment, the sensors are associated with the lowest level 15E of the factory. The monitored variables may be collected for the purposes of fault detection and classification. In one embodiment, fault detection may include determining that the processing tools 30 are operating within acceptable parameters. The types of variables monitored and subsequently analyzed are typically implementation specific. Exemplary variables collected by the sensors 50 may include the temperature level, pressure level, gas flow rate, processing tool parameters, and the like, as the wafers are being processed.

The topology of the illustrated system 10 of FIG. 1 is summarized as follows: the highest node is the factory, which may include one or more, "fab" modules 25 at the fabrication module level 15B. Each "fab" module 25 may in turn include one or more processing tools 30 at the tool level 15C. Each processing tool 30 may have one or more subsystems 40 associated therewith at the sub-system level 15D. Further, each sub-system 40 may include one or more sensors 50 at the lowest level 15E of the illustrated embodiment. The manufacturing system (factory) 10, "fab" modules 25, processing tools 30, sub-systems 40, and sensors 50 of the various levels 15A-E may each be considered as a "node" of a particular level 15 for the purposes of this discussion. It is noted that the topology of the manufacturing system 10 of FIG. 1 is exemplary in nature and that other embodiments may employ different topologies, with fewer or additional levels 15 than the illustrated embodiment.

Figure 2:
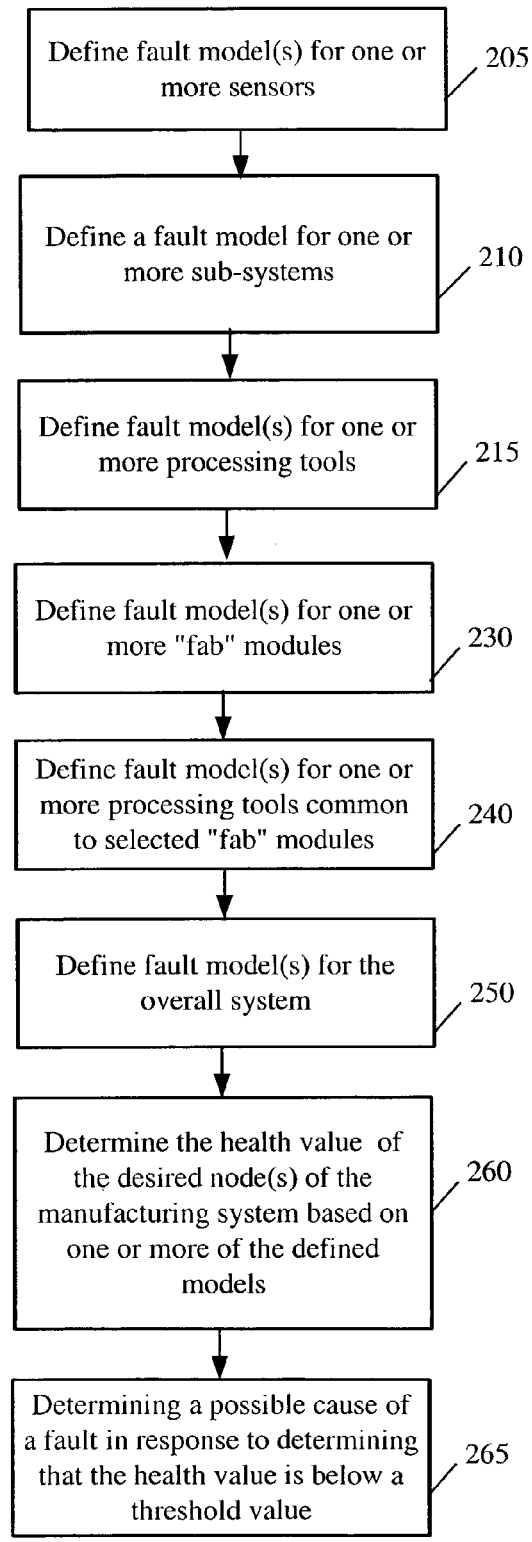
FIG. 2 illustrates a flow diagram of a method that may be implemented in the system of FIG. 1, in accordance with one embodiment of the present invention.

Referring now to FIG. 2, a flow diagram of a method that may be implemented in the system 10 of FIG. 1 is illustrated, in accordance with one embodiment of the present invention. As described in greater detail below, fault models may be defined for one or more of the desired nodes at the various levels 15A-E of the system 10 to determine the health value or the performance level of the nodes. Determining the health value or the performance level may include determining whether the particular node is experiencing a faulty operation, operating within acceptable limits, operating at the borderline, and the like.

In accordance with one embodiment of the present invention, at least one fault model may be defined (at 205 and 210) for one or more of the sensors 50 (see FIG. 1) and for one or more of the sub-systems 40 of a processing tool 30.

Further, in one embodiment, at least one fault model may be defined (at 215 and 230) for one or more of the processing tools 30 and the "fab" modules 25. In one embodiment, defining a fault model at 215 may include defining a fault model between multiple processing tools 30. A fault model may be defined or generated in any desired manner, including based on historical data that was previously collected from the same or other similar-type equipment or processes. In general, a fault model, taking into account process drifts and deviations, indicates an acceptable operational range for the equipment associated with a particular node.

In some instances, one or more of the processing tools 30 may be shared by (or common to) different "fab" modules 25." For example, a deposition tool may be part of a plurality of "fab" modules 25. It may be desirable to define (at 240) one or more fault models for processing tool(s) 30 that are shared by different "fab" modules 25. In one embodiment, defining a fault model (at 230 and 240) may include defining a fault model across fab modules.

In one embodiment, at least one fault model may be defined (at 250) for the overall system (or factory) 10. The fault model may be representative of the expected operation of the system 10, for example.

In accordance with one embodiment of the present invention, the health value (or performance level) of a particular node or nodes of the system 10 may be determined (at 260) based on one or more of the defined fault models. The health value of the node(s) may be determined (at 260), for example, based on applying selected fault models associated with a node to operational data that is received from that node of the system 10. That is, a "confidence value" may be generated for a given node based on applying the received operational data to the fault model of that node, where the confidence value is indicative of the performance level (e.g., operating as desired, operating outside an acceptable range, etc.). The operational data may include trace data, metrology data, or a combination of both, that is received from the node(s). The trace data may include data related to the processing of workpieces by the various nodes of the system 10, data associated with the operating condition of the hardware/software components of the nodes, and the like. In one embodiment, the trace data may be provided in substantially real-time.

In the method of FIG. 2, the performance level may be determined (at 260) for a given node based on the confidence values associated with the lower-level nodes. For example, the performance level of the factory node (i.e., the highest level node) may be determined based on the confidence values calculated for each of the "fab" modules 25 belonging to the next lower level 115B. The confidence values of the "fab" modules 25 in turn may depend on the confidence values calculated for the processing tools 30 from the next lower level 15C. The above-process may be repeated down to the sensor level 15E, with each node depending in part on the confidence value calculated for the lower-level nodes that are of the same branch.

The complexity and the number of fault models defined for a particular node of the system 10 may vary from one implementation to another. The fault model(s) may be based on simple or complex mathematical equations. An exemplary simple fault model that may be employed at the factory level 15A may comprise averaging the confidence values received from the preceding level 15B (i.e., the "fab" modules 25 of that level 15B) to determine an overall health value of the factory. Alternatively, a more complex mathematical model may be employed to determine the health value of the factory.

The health value determined (at 260) for a particular node is generally an indication of the level of performance of that node. For example, a relatively low health value may be indicative of a poorly performing node, whereas a relatively high health value may indicate that the node is performing as desired. In one embodiment, the determined health value (at 260) may be compared to a threshold value to determine if the node is performing at an acceptable level. If it is determined that the health value is below the threshold value for a given node, an indication that a fault may have occurred, then, in one embodiment, a possible cause of the fault is determined (at 265) based on the fault model associated with that node. The possible cause(s) of the fault, a process commonly referred to as fault classification, may be determined (at 265) in any one of a variety of ways known to those skilled in the art having the benefit of this disclosure.

Figure 3:
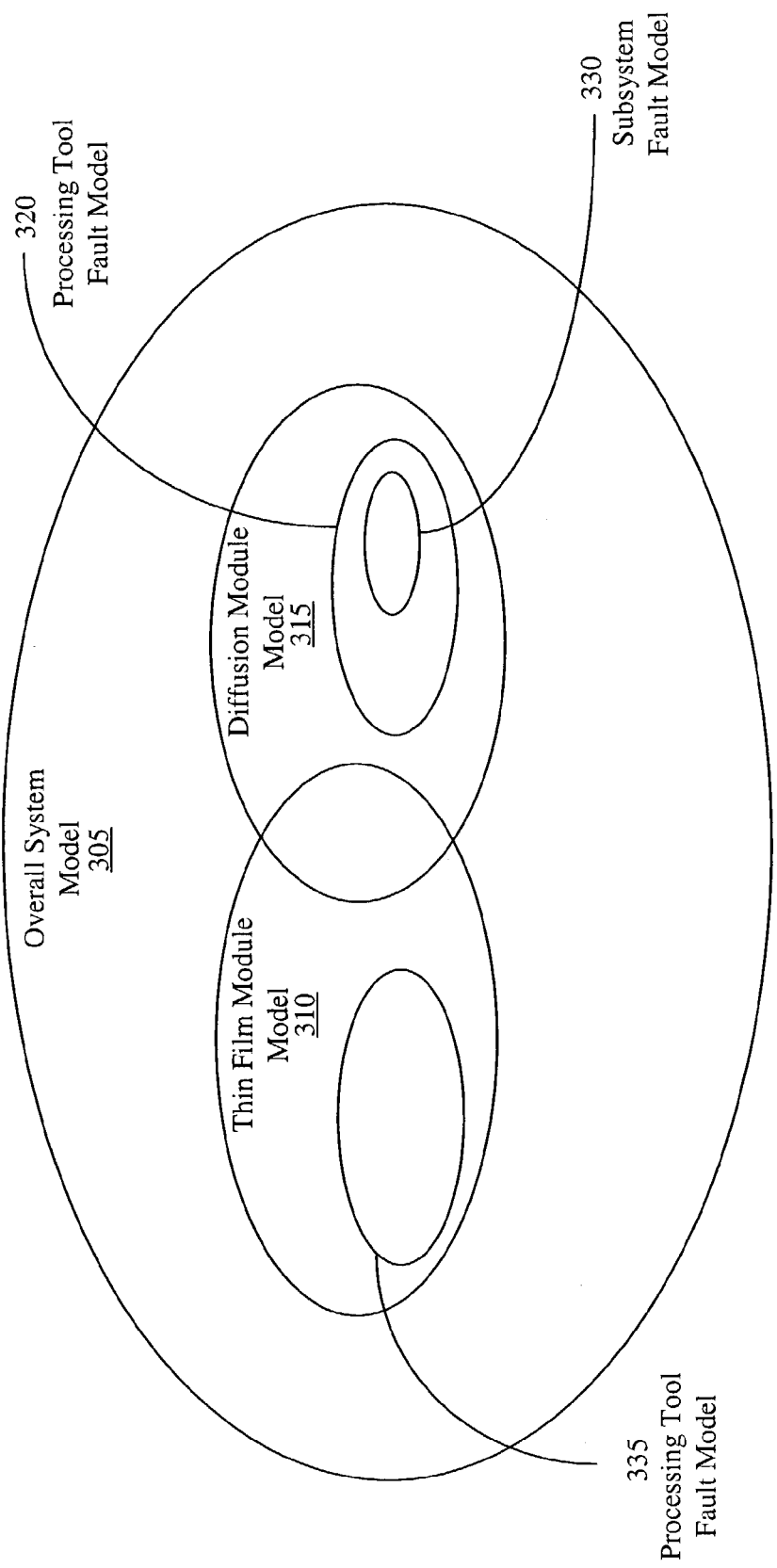
FIG. 3 depicts an exemplary high-level fault model that may be employed in the system of FIG. 1, in accordance with one embodiment of the present invention.

Referring now to FIG. 3, a high-level graphical representation of exemplary fault models that may be defined for the various levels 15 of the system 10 of FIG. 1 are illustrated, in accordance with the present invention. For the purposes of this illustration, it is assumed that the system 10 includes two "fab" modules 25, namely diffusion and thin film modules.

In the illustrated example, a fault model 305 is provided for determining an overall health value of the system 10. FIG. 3 further includes a fault model 310 for the thin film module, and a fault model 315 for the diffusion module. The diffusion module further includes a fault model 320 for a processing tool 30 within that module, and another fault model 330 for a sub-system 40 within the processing tool 30. The thin film module includes a fault model 335 for a processing tool 30 associated with the thin film module. Thus, in the illustrated example of FIG. 3, the health value of the system 10 may be determined at various levels, ranging from the system (factory) level 15A down to at a sub-system level 15D of the processing tool 30 of the diffusion module. For the thin film module, the health value may be determined down to a processing tool level 15C.

Figure 4:
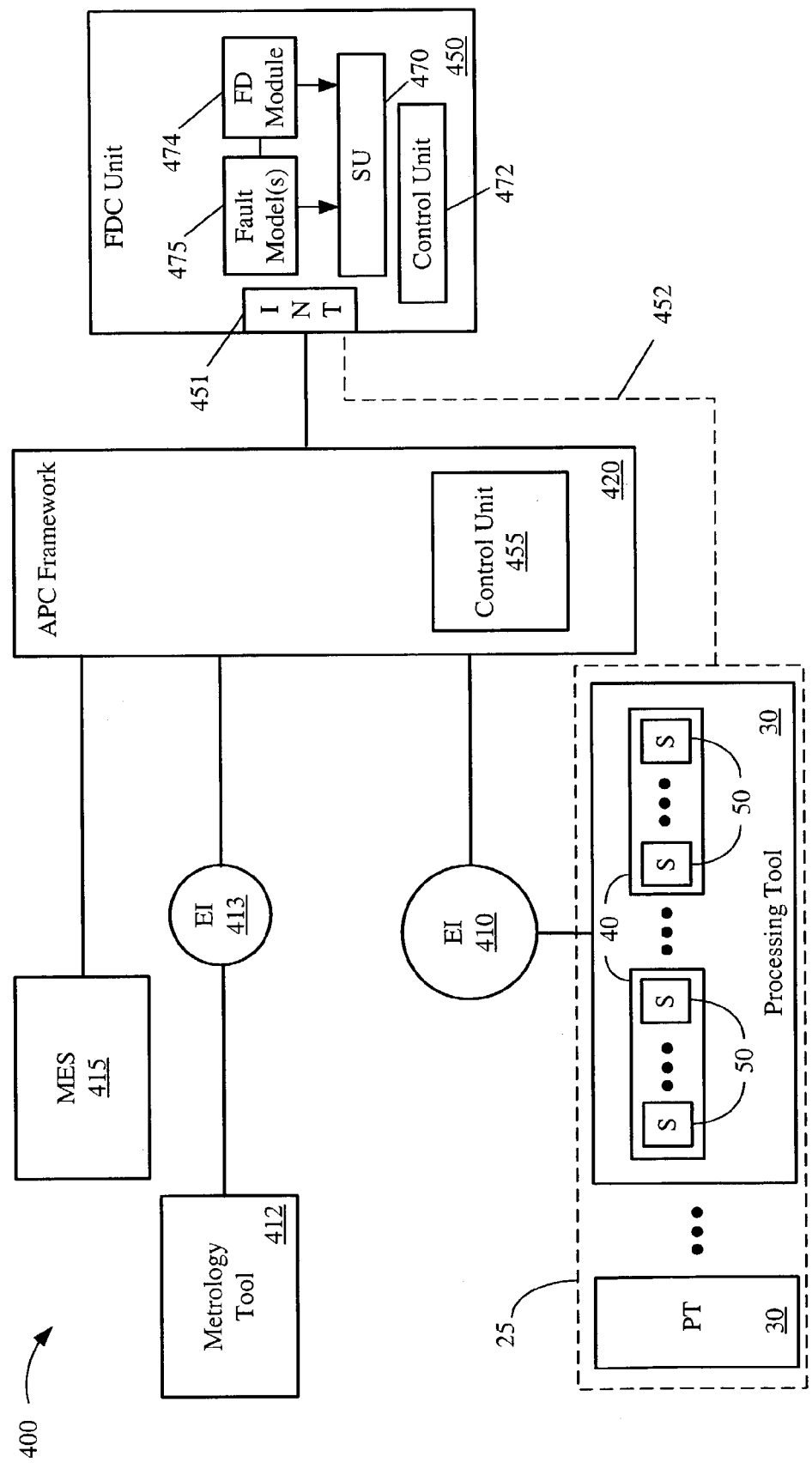
FIG. 4 illustrates a block diagram of a manufacturing system, in accordance with one embodiment of the present invention.

Referring now to FIG. 4, a block diagram of an exemplary manufacturing system 400 is illustrated, in accordance with one embodiment of the present invention. The manufacturing system 400 may be one embodiment of the system 10 of FIG. 1. The system 400 of FIG. 4 includes a "fab" module 25 (e.g., etch, thin film, diffusion, CMP, and the like) that has a plurality of processing tools 30 associated therewith.

The processing tools 30, in the illustrated embodiment, may take the form of any semiconductor fabrication equipment used to produce a processed workpiece, such as a silicon wafer. The semiconductor process may be utilized to produce a variety of integrated circuit products including, but not limited to, microprocessors, memory devices, digital signal processors, application specific integrated circuits (ASICs), or other similar devices. An exemplary processing tool 30 may include an exposure tool, an etch tool, a deposition tool, a polishing tool, a rapid thermal anneal processing tool, a test-equipment tool, an ion implant tool, a packaging tool and the like. It should be appreciated that the processing tool 30 need not necessarily be limited to processing silicon wafers, but may produce a variety of different types of commercial products without departing from the spirit and scope of the present invention.

In the manufacturing system 400 of FIG. 4, each processing tool 30 may have an associated equipment interface 410. The manufacturing system 400 includes a metrology tool 412 having an associated equipment interface 413, where the metrology tool 412 may provide offline and/or inline measurements of various aspects of the workpieces that are processed by the processing tools 30. The equipment interfaces 410, 413 are adapted to interface with an Advanced Process Control (APC) framework 420.

The manufacturing system 400 may include a manufacturing execution system (MES) 415 that is coupled to the APC framework 420. The manufacturing execution system 415 may, for example, determine the processes that are to be performed by each processing tool 30, when these processes are to be performed, how these processes are to be performed, etc. In the illustrated embodiment, the manufacturing execution system 415 manages and controls the overall system through the APC framework 420.

The APC framework 420 includes a control unit 455 that, through a feedback (or feedforward) loop, aids the processing tools 30 toward performing a desired process to thereby achieve a desired result.

An exemplary APC framework 420 that may be suitable for use in the manufacturing system 400 may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based on the Advanced Process Control (APC) Framework. CIM (SEMI E81-0699-Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif.

The processing tools 30, in the illustrated embodiment, may include one or more subsystems 40, where each subsystem 40 may generally perform one or more functions for the processing tool 30. Depending on the type of the processing tool 30, examples of the subsystem 40 may include a workpiece handling sub-system that transports workpieces (e.g., wafers) in and out of the processing tool 30, a pressure control sub-system for controlling the temperature within a processing tool chamber(s) (not shown), a gas flow control sub-system to govern the mass flow rate of the gas into the processing tool chamber(s), a radio frequency control sub-system for converting the gas into plasma or other desirable material, and a temperature control sub-system for regulating the temperature level(s) within the processing tool chamber(s). Generally, a group of selected components within the processing tool 30 may be designated as a "sub-system" 40 based on the function performed by those components. In alternative embodiments, any other suitable criteria may be utilized to designate "sub-systems" 40 in a processing tool 30. In one embodiment, each chamber of a processing tool 30, for example, may be a "sub-system" 40.

The sub-systems 40 of the processing tool 30 may include one or more sensors 50 for measuring a variety of variables in that respective sub-system 40. Examples of different types of variables that may be measured include temperature, pressure, and concentrations of gas mixtures or chemical agents employed by the processing tool 30, and the like. The measurements taken by the sensors 50 may then be used to detect faults associated with the processing of workpieces in the system 400.

The manufacturing system 400, in the illustrated embodiment, includes a fault detection and classification (FDC) unit 450 that is coupled to the APC framework 420 via an interface 451. The interface 451 may be any acceptable structure(s) that allow(s) the FDC unit 450 to communicate with other devices. In one embodiment, the interface 451 may support a network connection with the processing tool 30 via the equipment interface 410. In one embodiment, the one or more processing tools 30 may communicate with the FDC unit 450 without the APC framework 420, as graphically represented by the dotted line 452. The FDC unit 450 further includes a storage unit 470 and a control unit 472.

The FDC unit 450 includes a fault detection (FD) module 474, which allows the user to determine the performance level (or health) of one or more nodes of the system 400, starting from the system (factory) level node down to the sensor level node. The user may select one or more nodes for which the health value is desired through a graphical interface, for example. As noted earlier, determining the health value or the performance level may include determining whether the particular node is experiencing, for example, a faulty operation, operating within acceptable limits, operating at the borderline, and the like. In one embodiment, the FD module 474 determines the health value of a given node based on applying one or more fault models 475 defined in accordance with the method of FIG. 2. The FDC unit 450, in one embodiment, may include a classification module (not shown) for classifying the detected fault(s).

Determining whether a particular node is experiencing a faulty operation can be accomplished in any desired manner. One way is to compare received operational data, which may include trace data, metrology data, or a combination thereof, to a fault model (or models) 475 representing that node. As noted, a fault model may be generated based on historical data that was previously collected from the same or other similar-type equipment or processes.

The fault detection module 474 may be implemented in hardware, software, or a combination thereof, although, in the illustrated embodiment, the FD module 474 is implemented in software, and may be stored in the storage unit (SU) 470. The control unit 472 of the FDC unit 450, in one embodiment, manages the overall operations and executing one or more software applications resident in the storage unit 470.

It should be understood that the illustrated components shown in the block diagram of the system 400 in FIG. 4 are illustrative only, and that, in alternative embodiments, additional or fewer components may be utilized without deviating from the spirit or scope of the invention. For example, the processing tool 30 may have fewer or additional sub-systems 40. Additionally, it should be noted that although various components, such as the equipment interface 410 of the system 400 of FIG. 4 are shown as stand-alone components, in alternative embodiments, such components may be integrated into the processing tool 30. Similarly, the FDC unit 450 may be integrated into the APC framework 420. Additionally, the storage unit 470 of the FDC unit 450 may be located at any suitable location in the manufacturing system 400 such that various components of the manufacturing system 400 can access the contents stored therein.

The various system layers, routines, or modules may be executable by the control unit 455, 472 (see FIG. 4). As utilized herein, the term "control unit" may include a microprocessor, a microcontroller, a digital signal processor, a processor card (including one or more microprocessors or controllers), or other control or computing devices. The storage unit 470 (see FIG. 4) referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
defining a first fault model associated with a first node of a first level of a manufacturing system;
defining a second fault model associated with a second node of a second level of the system;
defining a third fault model associated with a third node associated with a third level of the system, where the second and third levels are lower than the first level;
processing workpieces in the manufacturing system;
receiving operational data associated with the processing of the workpieces;
and
determining a health value associated with the first node based on applying at least a portion of the operational data to the second fault model and applying at least a portion of the operational data to the third fault model.

2. The method of claim 1, wherein determining the health value comprises determining the health value associated with the first node of a semiconductor manufacturing system.

3. The method of claim 1, wherein defining the third fault model comprises defining the third fault model for the semiconductor manufacturing system.

4. The method of claim 1, wherein determining the health value associated with the first node comprises combining a health value associated with the second node and a health value associated with the third node.

5. The method of claim 4, further comprising determining if the health value is less than a preselected threshold value, wherein the threshold value is indicative of an acceptable level of performance.

6. The method of claim 5, further comprising determining a possible cause of a fault in response to determining that the health value is less than the preselected threshold value.

7. The method of claim 1, wherein determining the health value comprises determining the health value associated with at least one of a factory node, a fab module node, and a processing tool node.

8. The method of claim 7, further including defining a fourth fault model associated with a second fab module node and determining a health value associated with the second fab module, and wherein determining the health value associated with the factory node comprises combining at least two of the health values associated with the fab modules.

9. An apparatus, comprising:
a storage unit adapted to store:
a first fault model associated with a first node of a first level of a manufacturing system;
a second fault model associated with a second node of a second level of the system; and
a third fault model associated with a third node associated with a third level of the system; and
a control unit adapted to:
receive operational data associated with the processing of workpieces in the manufacturing system:
apply at least a portion of the operational data to the second fault model to determine a health value associated with the second node and apply at least a portion of the operational data to the third fault model to determine a health value associated with the third node; and
determine a health value associated with the first node based on combining the health value associated with the second node and the health value associated with the third node of the system.

10. The apparatus of claim 9, wherein the control unit is adapted to determine the health value associated with the first node of a semiconductor manufacturing system.

11. The apparatus of claim 10, wherein the control unit is adapted to define the first fault model for the semiconductor manufacturing system.

12. The apparatus of claim 9, wherein the control unit is adapted to receive operational data associated with the second and third nodes and to compare the operational data from the second and third nodes to the respective second and third fault models.

13. The apparatus of claim 12, wherein the control unit is adapted to determine if the health value is less than a preselected threshold value, wherein the threshold value is indicative of an acceptable level of performance.

14. The apparatus of claim 9, wherein the control unit is adapted to determine the health value associated with at least one of a factory node, a fab module node, and a processing tool node.

15. The apparatus of claim 14, wherein the control unit is further adapted to define a fourth fault model associated with a second fab module node, determine a health value associated with the second fab module, and determine the health value associated with the factory node based on combining at least two of the health values associated with the fab modules.

16. The apparatus of claim 9, wherein the storage unit is further adapted to store a fault model associated with a node at a sub-system level of a processing tool and to store a fault model associated with a node at a sensor level of the sub-system.

17. An apparatus, comprising:
means for defining a first fault model associated with a first node of a first level of a manufacturing system;
means for defining a second fault model associated with a second node of a second level of the system;
means for defining a third fault model associated with a third node associated with a third level of the system;
means for processing workpieces in the manufacturing system;
means for receiving operational data associated with the processing of the workpieces;
and
means for determining a health value associated the first node based on applying at least a portion of the operational data to the second fault model and applying at least a portion of the operational data to the third fault model.

18. An article comprising one or more machine-readable storage media containing instructions that when executed enable a processor to:
define a first fault model associated with a first node of a first level of a system;
define a second fault model associated with a second node of a second level of the system;
define a third fault model associated a third node associated with a third level of the system;
receive operational data associated with the processing of workpieces in the manufacturing system;
apply at least a portion of the operational data to the second fault model to determine a health value associated with the second node and apply at least a portion of the operational data to the third fault model to determine a health value associated with the third node; and
and
determine a health value associated with the first node based on the health value associated with the second node and the health value associated with the third node of the system.

19. The article of claim 18, wherein the instructions when executed enable the processor to determine the health value associated with the first node of a semiconductor manufacturing system.

20. The article of claim 19, wherein the instructions when executed enable the processor to determine the health value associated with at least one of a factory node, a fab module node, and a processing tool node.

21. The article of claim 18, wherein the instructions when executed enable the processor to receive operational data associated with the second and third nodes and to compare the operational data from the second and third nodes to the respective second and third fault models.

22. The article of claim 21, wherein the instructions when executed enable the processor to determine if the health value is less than a preselected threshold value, wherein the threshold value is indicative of an acceptable level of performance.

23. A method for determining a performance level of a component in a factory having a plurality of process modules that each have a plurality of processing tools, the method comprising:
defining a first fault model for at least one of the processing tools of the process modules;
defining a second fault model for at least one of the process modules of the factory;
defining a third fault model for the factory; and
determining the performance level of the component based on the at least one of the first fault model, second fault model, and third fault model.

24. The method of claim 23, wherein determining the performance level comprises receiving operational data from at least one of the two processing tools and comparing the operational data to at least one of the first fault model, second fault model, and the third fault model.

25. The method of claim 24, wherein determining the performance level comprises determining the performance level of the factory.

26. A manufacturing system, comprising:
a module that includes at least two processing tools capable of processing workpieces, the module adapted to provide operational data associated with the processing of workpieces; and
a fault detection system adapted to:
define a first fault model associated with at least one of the two processing tools;
define a second fault model associated with the module;
define a third fault model associated with the system; and
determine a health value based on operational data and the at least one of the first fault model, second fault model, and third fault model.

27. The system of claim 26, wherein an advanced process control is coupled between the processing tools and the fault detection system.

* * * * *